US006220883B1

(12) United States Patent
Helot et al.

(10) Patent No.: US 6,220,883 B1
(45) Date of Patent: Apr. 24, 2001

(54) COMPUTER UNDERSIDE DOCKING METHOD AND APPARATUS

(75) Inventors: Jacques H. Helot, San Mateo, CA (US); Michael D. Derocher, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/566,856

(22) Filed: May 8, 2000

Related U.S. Application Data

(63) Continuation of application No. 09/071,126, filed on Apr. 30, 1998.

(51) Int. Cl.[7] ....................................................... H01R 4/50

(52) U.S. Cl. .......................... 439/341; 439/137; 439/310; 439/929

(58) Field of Search ..................................... 439/142, 374, 439/341, 372, 928, 378, 137, 310, 929

(56) References Cited

U.S. PATENT DOCUMENTS

| 4,969,830 | 11/1990 | Daly et al. | 439/136 |
|---|---|---|---|
| 5,310,358 | 5/1994 | Johnson et al. | 439/358 |
| 5,488,572 | * 1/1996 | Belmont | 439/374 |
| 5,535,093 | 7/1996 | Noguchi et al. | 361/686 |
| 5,619,398 | 4/1997 | Harrison et al. | 361/686 |
| 5,882,220 | * 3/1999 | Horii et al. | 439/374 |

* cited by examiner

Primary Examiner—Neil Abrams
Assistant Examiner—Phuong KT Dinh

(57) ABSTRACT

Docking of a notebook computer having an underside docking connector is facilitated by a depressible ramp at a docking station. The computer is slid onto the ramp and guided into a prescribed position. The user then actuates a lever which lowers the ramp and computer. As the computer and ramp move downward, the computer's docking connector mates to a docking connector in the docking station. The computer includes guide tracks and an alignment member along the undersurface of the computer housing. The docking station includes rails and an alignment member corresponding to the guide tracks and alignment member of the computer. Alternative to moving a ramp, is a rotatable docking connector moved by a lever.

7 Claims, 7 Drawing Sheets

COMPUTER UNDERSIDE DOCKING METHOD AND APPARATUS

This is a continuation of application Ser. No. 09/071,126 filed on Apr. 30, 1998.

BACKGROUND OF THE INVENTION

This invention relates generally to portable computer docking at a docking connector, and more particularly, to docking a portable computer at an underside docking connector.

Portable "personal" computers have developed from the early cumbersome suitcase design to smaller laptop designs to the now commercially-predominant notebook, sub-notebook and palm top computers. The evolution has been toward smaller, lighter computers with increasing transportability and usability. The state of the art continues to improve by (i) increasing battery life, (ii) decreasing circuitry and system weight, (iii) adapting compartments for add-in cards, and (iv) decreasing housing size.

The typical portable computer includes a display screen housing hinged to a keyboard housing. The display screen housing folds down against the keyboard where the two housings latch together. A disk drive often is mounted in the keyboard housing. Additional features include a docking connector, input/output ports and one or more compartments for receiving PCMCIA cards, (peripheral devices conforming to the Personal Computer Memory Card International Association (PCMCIA) standards for personal computer-based peripherals).

Even though the processing throughput, memory and other performance features of a notebook computer are achieving similar levels to desktop computers, there still are trade-offs for using a notebook computer. Typically, the keyboard and display are smaller than are used for desktop computers. Larger displays and keyboards are desired for usability and ergonomic reasons. As a result, it is common to have a docking station in a desktop environment. A full-size keyboard, a desk top display monitor, additional memory storage devices, network resources, and peripherals, typically are accessible through the docking station.

It is desirable that the connection and disconnection between the notebook computer and the docking station be easy, convenient and reliable.

Portable computers often are used in an office environment with a docking station. One concern with such usage is the ease with which a portable computer can be removed and stolen. Accordingly, there is a desire for including security precautions in a docked notebook computing environment.

SUMMARY OF THE INVENTION

According to the invention, a notebook computer includes an underside docking connector which connects to a docking station with a vertical action. Features for securing the computer are included in the docking action.

According to one aspect of the invention, docking of a notebook computer having an underside docking connector is facilitated relative motion between a ramp at the docking station and a docking connector of the notebook computer. To dock the notebook computer, the computer is slid onto the ramp and guided into a prescribed position. In one docking method, the user then pushes the computer down, depressing the ramp about a pivot line. In an alternative docking method, the user moves a lever which moves the ramp about the pivot line. As the computer and ramp move downward, the computer's docking connector mates to a docking connector in the docking station. In an alternative apparatus, the docking station's connector moves with the lever, instead of the ramp, to cause docking.

According to one aspect of this invention, the computer includes guide tracks and an alignment member along the undersurface of the computer housing. Such undersurface is the surface upon which the computer normally rests, while in use. The computer's docking connector is accessible from such undersurface during a docking process.

According to another aspect of the invention, the docking station includes a ramp having rails upon which the computer slides. The docking station also includes an alignment member corresponding to the alignment member of the computer. During docking, the computer is placed on the docking station and slid along the ramp with the ramp rails running within the computer's undersurface tracks. When the computer reaches a prescribed position the alignment members of the computer and docking station mate or otherwise align. While in the alignment position, the docking connectors of the computer and docking station are poised for mating.

According to another aspect of this invention, the ramp includes an opening through which the station's docking connector is accessible during docking. The ramp rotates about a pivot line relative to the remainder of the docking station. As the notebook computer and ramp come down, the docking connector of the computer moves toward and mates with the docking connector in the docking station accessible through the ramp. Undocking is achieved by a lever release.

According to another aspect of this invention, the docking station includes hooking mechanisms which hook into an opening along a rear edge of the computer. The hooking mechanisms ensure that the portable computer and docking station docking connectors are aligned before docking is attempted. This prevents connector damage. Such hooking mechanisms also serve to prevent an operator from removing the notebook computer while docked without going throough an appropriate undocking sequence.

According to another aspect of this invention, the underside docking and the rear edge hooking fix the computer relative to the docking station along three axes of motion. Thus, the computer is secure. Additional security is achieved by locking the lever in position so that the computer cannot be undocked or removed. A physical lock or solenoid are exemplary locking mechanisms to secure the lever. The hooking mechanisms and the locked lever serve to secure the notebook computer in the docked position.

According to another aspect of the invention, the docking connector at the undersurface of the notebook computer is normally unexposed. During the docking process a door in the computer housing opens allowing access to the docking connector. In one embodiment, a docking station structure pushes the notebook computer's connector door open as the computer slides along the ramp into the alignment position.

According to another aspect of this invention, the docking station docking connector normally is covered by a door. During docking such door is opened allowing access to the station's docking connector. In one embodiment the station's door is in the docking ramp and is opened by the station docking connector pushing open the door as the ramp rotates down toward the station's docking connector.

According to another aspect of the invention, a notebook computer with an underside expansion module is capable of docking at the docking station using underside connectors.

Another advantage of the invention is that the docking process is easy, convenient and reliable. The operator slides the computer onto the ramp, then pushes down on the computer or moves a lever. Such manual docking has the ease and reliability of an automated process, but is achieved at substantially less cost. Another advantage is that the docking connectors are unexposed while the computer is away from the docking station. These and other aspects and advantages of the invention will be better understood by reference to the following detailed description taken in conjunction with the accompanying drawings.

DESCRIPTION OF SPECIFIC EMBODIMENTS

Overview

Figures 1, 2:
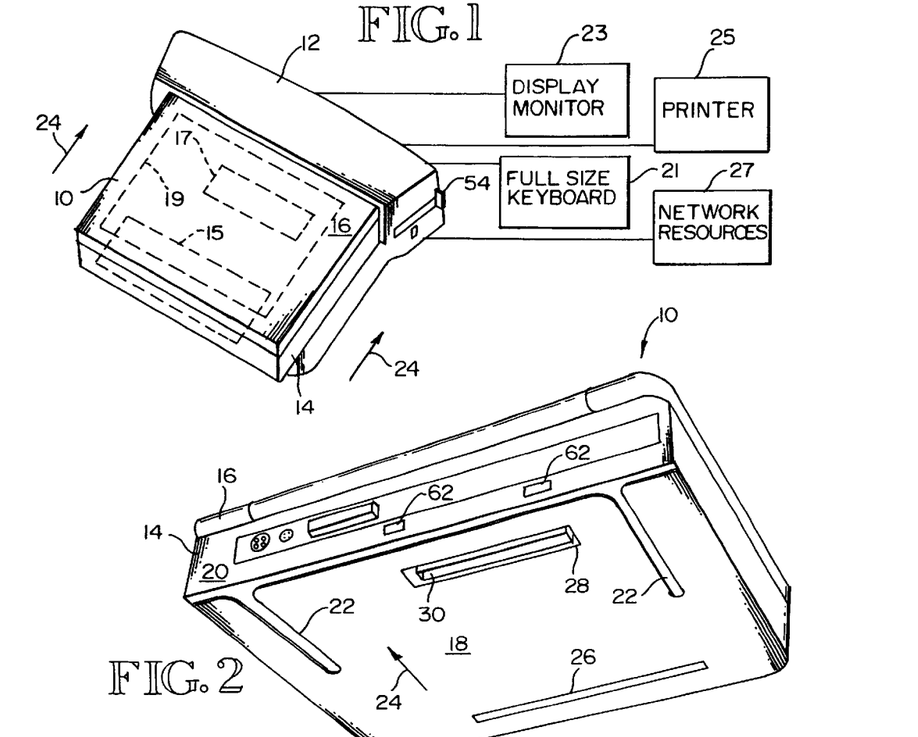
FIG. 1 is a perspective view of a notebook computer docked at a docking station according to an embodiment of this invention.
FIG. 2 is a perspective view showing an undersurface and rear edge of the notebook computer of FIG. 1.

FIG. 1 shows a notebook computer 10 docked at a docking station 12 according to an embodiment of this invention. The notebook computer 10 includes a lower housing compartment 14 and an upper housing compartment 16. As one or ordinary skill in the art would appreciate, the lower housing compartment 14 includes an embedded keyboard 15, main computer board 17, and one or more compartments for receiving peripheral devices. Many portable computers 10 also include a floppy disk drive, hard disk drive, CD-ROM and battery pack in the lower compartment 14. Other common internal or plug-in peripherals include fax devices and modems devices. The upper housing compartment 16 typically includes the display screen 19 and related display driver circuitry. Typically the docking station 12 includes multiple ports for connecting to an external full-size keyboard 21, a display monitor 23 and other computer devices and resources (e.g., a printer 25 and network resources 27). This invention is directed toward components of the computer 10 and docking station 12 which facilitate docking.

FIG. 2 shows the undersurface 18 and rear edge 20 of the notebook computer 10. "Undersurface" as used herein refers to the portion of the lower compartment 14 upon which the computer 10 rests during docking and normal operation. "Rear edge" refers to the portion of the lower compartment 14 facing away from an operator during normal operation of the notebook computer (e.g., operator faces display of open upper compartment 16 with access to an internal keyboard.) One or more parallel tracks 22 are located in the computer undersurface 18. These tracks 22 extend in a direction 24 parallel to a direction of motion of the computer 10 relative to the docking station 14 during a docking process. In the embodiment illustrated there are two tracks 22 formed as indentations. In an alternative embodiment the tracks 22 are protruding rails. The tracks 22 are flared at the distal portion providing a wider lead-in that allows the computer 10 to slide into a desired lateral alignment. In such lateral alignment the tracks 22 mate with corresponding members 60 at the docking station 12.

Also located at the undersurface 18 is an alignment member 26 and a docking connector opening 28. A docking connector 30 is accessible through the connector opening 28. In some embodiments a door (see FIG. 8) blocks the opening 28 preventing access to the docking connector 30 while the computer 10 is undocked. The door prevents damage to the connector 30 and prevents dust from accumulating on the connector 30. The alignment member 26 is for mating to a corresponding alignment member 32 at the docking station 12 (see FIG. 3). In the embodiment illustrated the alignment member 26 is formed as an opening in the computer undersurface 18 while the alignment member 32 is formed as a protruding rail at the docking station 12. It is preferable that the alignment members 26, 32 have a mating relation. In alternative embodiments the mating structures may vary. For example, the member 26 may be a protrusion instead of an indentation or opening, while the member 32 is an indentation or opening instead of a protrusion. In addition the members 26, 32 need not be single elongated members, but may be multiple elongated members, or may be one or more corresponding posts, ridges or other protrusions and one or more opening, notches or other indentations.

Figure 3:
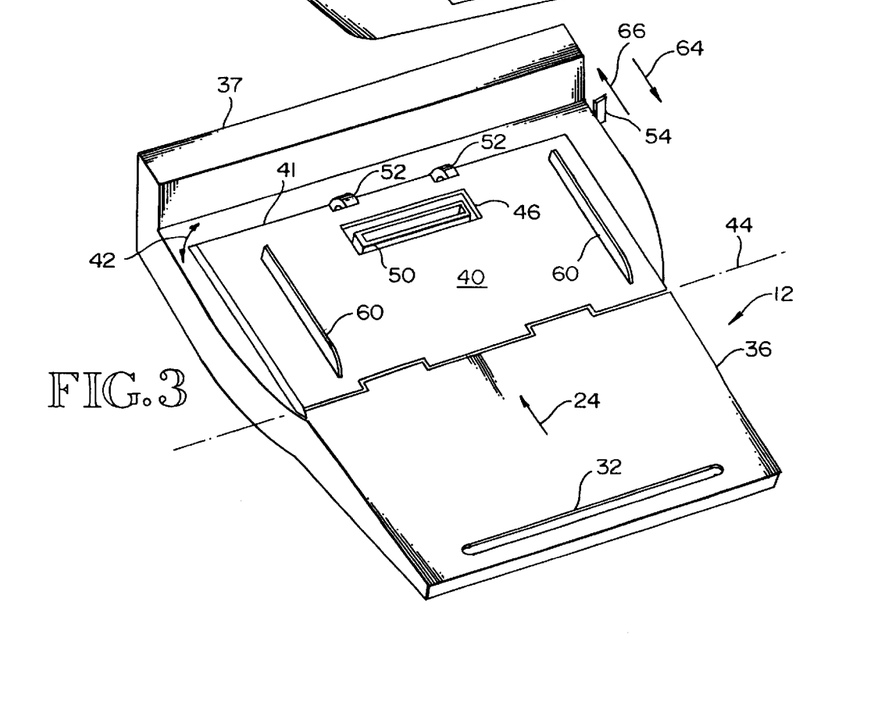
FIG. 3 is a perspective view of a docking station according to an embodiment of this invention.

Referring to FIG. 3 the docking station 12 includes a platform 36 and a ramp 40. The platform 36 includes a back panel 37 with connectors (not shown) for interfacing to the full size keyboard 21, the display monitor 23, the printer 25, and the network resources 27. The ramp 40 is coupled to the platform 36. A distal portion 41 of the ramp 40 is movable up and down (depicted by bidirectional arrow 42) relative to the platform 36 about an axis 44. The ramp 40 includes an opening 46 for exposing the docking station docking connector 50. The docking connector 50 is a mechanical connector having electrical contacts for forming and maintaining an electrical interface with the notebook computer 10. The docking connector 50 is fixed relative to the platform 36. As the ramp distal portion 41 rotates downward toward the platform 36, the docking connector 50 protrudes through the opening 46. In one embodiment the ramp 40 includes one or more doors (see FIG. 9) for protecting the docking connector 50 in the absence of the computer 10. The door prevents damage to the connector 50 and prevents dust from accumulating on the connector 50.

The ramp 40 also includes guide rails 60 and hooking members 52. During docking, the computer 10 is moved along the rails 60 with the rails 60 mating to the computer undersurface's tracks 22. The hooking members 52 are located at the distal portion 41 of the ramp. The hooking members 52 mate with the computer 10 during docking and secure the computer 10 to the docking station 12. In particular the hooking members 52 ensure that the portable computer and docking station docking connectors are aligned before docking is attempted. This prevents connector damage. Such hooking mechanisms also serve to prevent an operator from removing the notebook computer while docked. To release the hooking mechanisms an appropriate undocking sequence is to be followed.

Figure 5A:
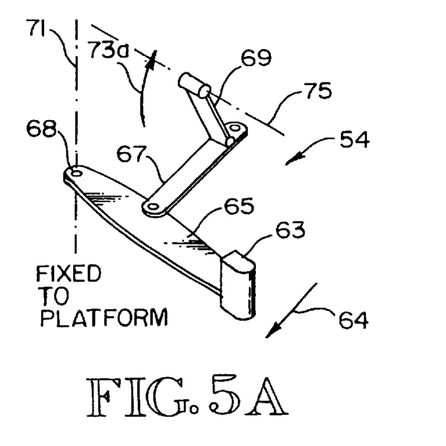
FIGS. 5a–b are diagrams of a linkage for raising and lowering the ramp of FIG. 3.
Figure 5B:
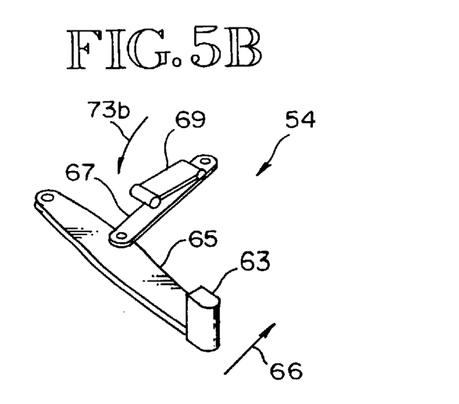

In a preferred embodiment the docking station 12 also includes a lever 54. The lever is moved in one direction 66 to facilitate docking and in another direction 64 to facilitate undocking of the computer 10 relative to the docking station 12. Referring to FIGS. 5*a* and 5*b,* an exemplary embodiment of the lever 54 includes a handle 63 and multiple links 65, 67, 69. The handle 63 is attached to link 65 which is anchored to the platform 36 at a node 68. The link 65 has one degree of freedom relative to the platform 36 for motion about an axis 71. The link 65 extends substantially the width of the platform to enable leverage motion of the lever 54. An end link 69 is fastened to an undersurface of the ramp 40. The end link 65 has one degree of freedom relative to the ramp 40 for rotational motion 73*a,* 73*b* about axis 75. A middle link 67 couples the end link 69 to the first link 65. Referring to FIG. 5*a,* the handle 63 is moved in direction 64 to rotate the link 69 in direction 73*a,* which raises the ramp 40 relative to the platform 36 and undocks the computer 10. Referring to FIG. 5*b,* the handle 63 is moved in direction 66 to rotate the link 69 in direction 73*b,* which lowers the ramp 40 and docks the computer 10. Although a specific linkage is described other linkages, lever structures and manual or automatic docking mechanisms may be used.

Docking Method

Figure 4A:
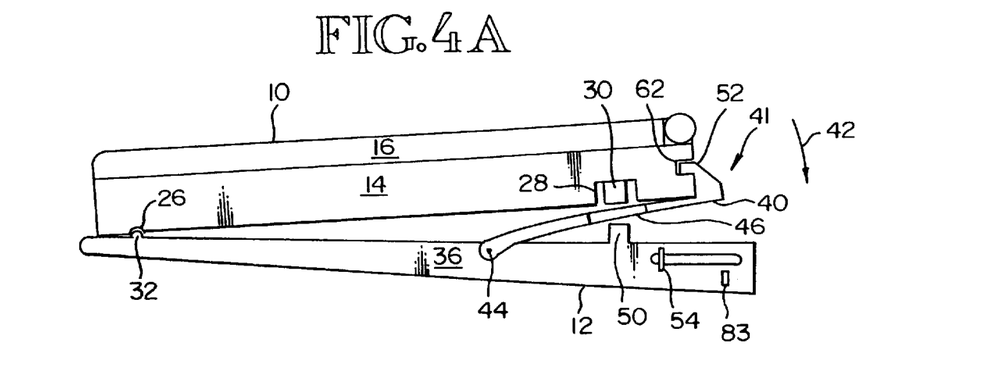
FIGS. 4a–b are diagrams of the notebook computer position relative to the docking station at steps of the docking process according to an embodiment of this invention.

To perform docking of the computer 10 to the docking station 12, the computer undersurface 18 is placed in contact with the platform 36 and slid in direction 24 along the platform 36 and up the ramp 40. In a preferred embodiment the computer 10 is slid manually by an operator, although in other embodiments an automated mechanism may cause the motion of the computer 10 relative to the platform 36. As the computer 10 is moved, the docking station rails 60 mate into the tracks 22 at the computer undersurface 18. In some embodiment the tracks 22 have a wide opening toward the computer rear edge 20 to facilitate the mating. As the computer 10 is slid up the ramp 40, the rails 60 and tracks 22 come into alignment. Eventually, the computer 10 slides into a prescribed alignment position as shown in FIG. 4*a.* In the alignment position the hooking members 52 at the ramp distal portion 41 mate into corresponding openings 62 (see FIGS. 2 and 4*a*) at the computer rear edge 20. In addition, while in the prescribed alignment position, the respective alignment members 26 and 32 of the computer 10 and docking station 12 line up and mate (see FIG. 4*a*). The computer docking connector 30 is exposed to the docking station 12 through the opening 28. Similarly, the docking station connector 50 is exposed to the computer 10 through the opening 46.

Figure 4B:
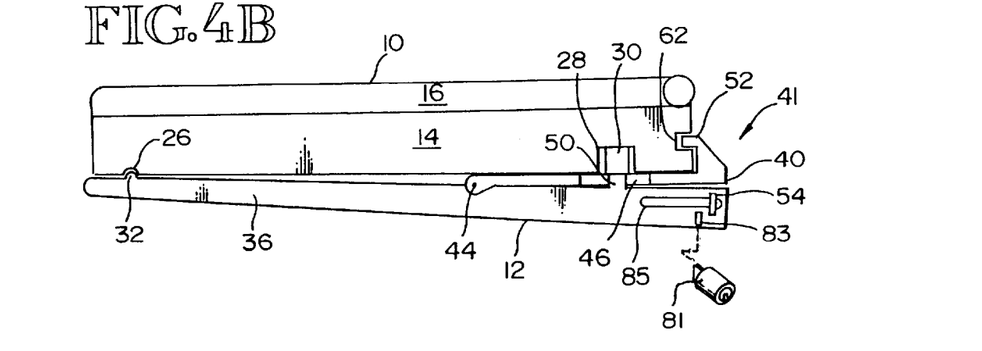

With the computer 10 slid into the prescribed alignment position, the next step is to move the computer 10 down in the direction 42. For example, the operator manually pushes downward on the rear portion of the computer 10 (e.g., along the upper housing 16 toward rear edge 20). This action rotates the ramp distal portion 41 toward the platform 36 as shown in FIG. 4*b.* In a preferred embodiment a lever 54 is moved by the operator. The lever 54 is linked to the ramp 40. As the lever handle 63 is moved from a first position to a second position in direction 66, the distal ramp portion 41 rotates down toward the platform 36. As the computer 10 and ramp 40 come down, the docking connectors 30 and 50 mate. Once properly mated, the docking operation is complete.

In one embodiment the connection of the docking connectors 30, 50 is sufficient to hold the ramp 40 in the docked position of FIG. 4*b.* To undock the computer 10 the lever 54 is moved in direction 64 from the second position back to the first position. Movement of the lever 54 from the second position to the first position disconnects the docking connectors 30, 50 and pushes the ramp 40 upward (into the position shown in FIG. 4*a*).

The computer is docked with the lever 54 in the second position (see FIGS. 4*b* and 5*b*). While docked, the hooking mechanisms 52 prevent vertical movement of the computer 10 computer relative to the docking station 12. The docking connector 30, 50 prevent movement within a horizontal plane of the platform 36. Further the hooking mechanisms 52 also prevent lateral movement of the computer 10 relative to the docking station 12. According to one embodiment a locking mechanism 81 (e.g., a Kensington lock) is provided for locking the lever 54 in the second position. The lock 81 fits into an opening 83 adjacent to a lever slot 85. The lever 54 moves along the slot 85. The lock is inserted into the adjacent opening 83 while the lever 54 is in the second position. The lock blocks the movement of the lever 54 along track 85 preventing the lever 54 from leaving the second position. In addition, if such lock 81 is inserted and locked prior to docking the computer 10, the lock prevents the lever from moving into the second position. Thus the lock 81 also prevents unauthorized users from docking a computer 10 at a docking station 12. Accordingly, the lock 81 serves as a security device (i) for preventing someone from removing and stealing the computer 10, and (ii) for preventing someone from docking a computer without permission. The hooking members 52 and locked lever 54 prevent haphazard undocking which can lead to data loss.

Alternative Embodiment

Figure 6:
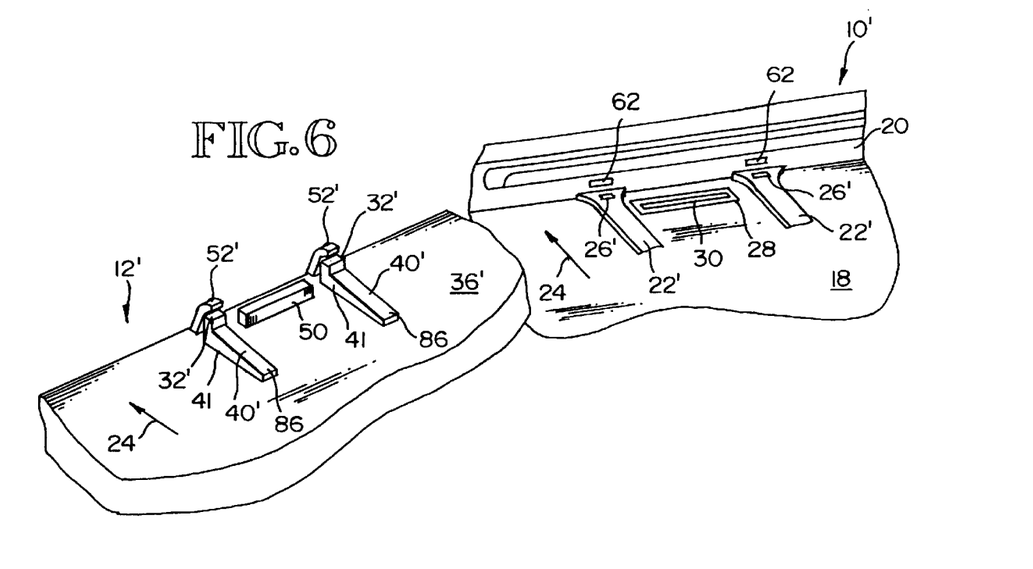
FIG. 6 is a partial perspective view of the docking components of the notebook computer and docking station according to an alternative embodiment of this invention.

FIG. 6 shows the computer 10' and docking station 12' having docking components according to an alternative embodiment of this invention. One or more parallel tracks 22' are located in the computer undersurface 18. These tracks 22' extend in a direction 24 parallel to a direction of motion of the computer 10' relative to the docking station 14 during a docking process. In the embodiment illustrated there are two tracks 22' formed as indentations.

Also located at the undersurface 18 is an alignment member 26' and the docking connector opening 28. The docking connector 30 is accessible through the connector opening 28. In some embodiments a door (see FIG. 8) blocks the opening 28 preventing access to the docking connector 30 while the computer 10 is undocked. An alignment member 26' is formed within each track 22' and serves to mate with a corresponding alignment member 32' at the docking station 12'. In the embodiment illustrated each alignment member 26' is formed as a further indentation within each track 22', while each corresponding alignment member 32' is formed as a protrusion extending above the surface 86 of the corresponding ramp 40'. It is preferable that the alignment members 26', 32' have a mating relation. In alternative embodiments the mating structures may vary as described for the prior embodiment.

The docking station 12' includes a base platform 36 and a pair of ramps 40'. A distal portion 41 of each ramp 40 is movable up and down relative to the platform 36 about an axis 44 (see FIGS. 7a–b). The platform 36 includes a docking connector 50 for mating to the connector 30 of computer 10'. The docking connector 50 is fixed relative to the platform 36 protruding upward from the platform 36 to a height less than the height of upper surface 86 of the ramps 40'. The ramps 40' serve as guide rails for running within the tracks 22' of the computer 10'.

The docking station 12' also includes hooking members 52'. Unlike the first embodiment, in the FIG. 6 embodiment the hooking members 52' extend from the platform 36. The booking members 52' are pivotable about an axis 45 (see FIGS. 7a–b). During docking the computer 10' is moved along the ramps 40' with the ramps 40' mated to the tracks 22. The hooking members 52' mate with the computer 10' during docking and secure the computer 10' to the docking station 12'.

Docking Method for the Alternative Embodiment

Figure 7A:
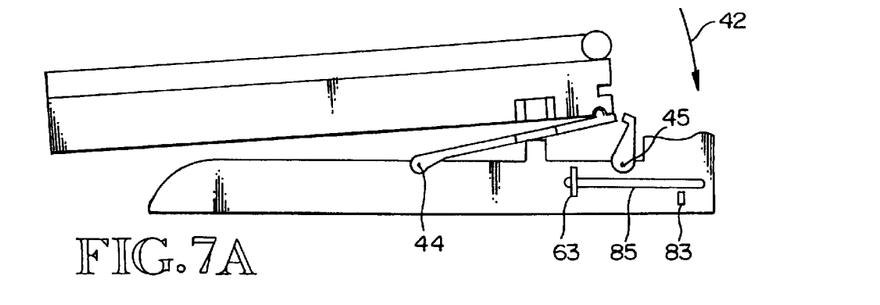
FIGS. 7a–b are diagrams of the notebook computer position relative to the docking station at steps of a docking process for the embodiment of FIG. 6.

To perform docking of the computer 10' to the docking station 12', the computer undersurface 18 is placed in contact with the platform 36 and slid in direction 24 along the platform and up the ramps 40'. In a preferred embodiment the computer is slid manually by an operator, although in other embodiments an automated mechanism may cause the motion of the computer relative to the platform 36. As the computer 10' is moved the docking station ramps 40' mate into the tracks 22 at the computer undersurface 18. In some embodiment the tracks have a wide opening toward the computer rear edge 20 to facilitate the mating. As the computer 10' is slid up the ramps, the ramps 40' and tracks 22 come into alignment. Eventually, the computer 20 slides into a prescribed alignment position as shown in FIG. 7a. While in the prescribed alignment position, the respective alignment members 26' and 32' of the computer 10' and docking station 12' line up and mate (see FIG. 7a). The computer docking connector 30 is exposed to the docking station 12' through the opening 28. Similarly, the docking station connector 50 is exposed to the computer 10' between the ramps 40'.

Figure 7B:
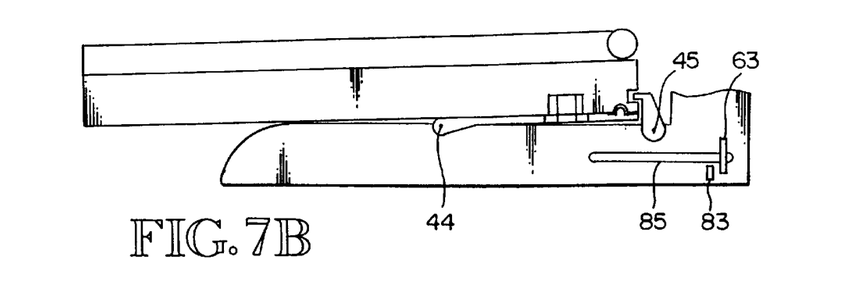

With the computer 10' slid into the prescribed alignment position, the next step is to move the computer 10' down in the direction 42. For example, the operator manually pushes downward at the rear portion of the computer 10' (e.g., along the upper housing 16 toward rear edge 20). Alternatively, a lever structure as described for the first embodiment may be used to perform the movement of the ramp. This downward action rotates the ramp distal portions 41 toward the platform 36 as shown in FIG. 7b. In addition, the lever includes a linkage to the hooking members 52'. The motion of the lever causes rotation of the hooking members 52' toward corresponding openings 62 (see FIGS. 6 and 7b) at the computer rear edge 20. In an alternative embodiment the ramps 40' come into contact with a cam connected to the hooking members 52', rotating the cam and hooking members 52'. As the computer 10' and ramps 40' come down, the docking connectors 30 and 50 mate. Once properly mated, the docking operation is complete.

Docking Connector Doors

Figure 8:
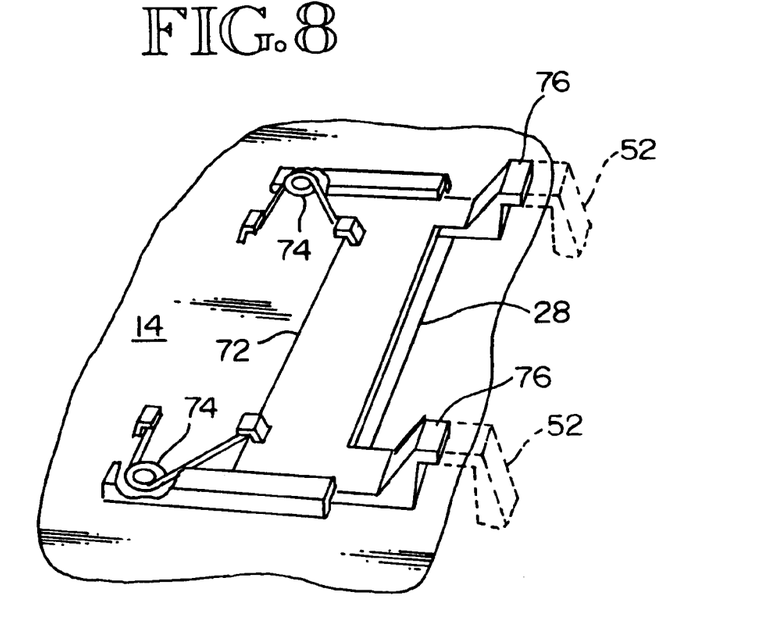
FIG. 8 is a partial perspective view showing a protective docking connector door in the computer housing.

In some embodiments the computer 10 includes a door 72 which covers the opening 28 (see FIG. 8). The door 72 serves to protect the docking connector 30 (see FIG. 2) from exposure through the opening 28 during times when access to the docking connector 30 is not needed (i.e., while undocked). The door 72 is located within the lower housing 14 of the computer adjacent to the undersurface 18. The door 72 is biased by springs 74 into a closed position. During docking, the docking station hooking members 52 extend through the computer rear edge openings 62. The hooking members 52 contact blocking corresponding blocking members 76 of the door 72. As the computer is pushed toward the alignment position of FIG. 4a or 7a, the hooking members 52 open the door 72 and hold the door 72 in the open position.

Figure 9:
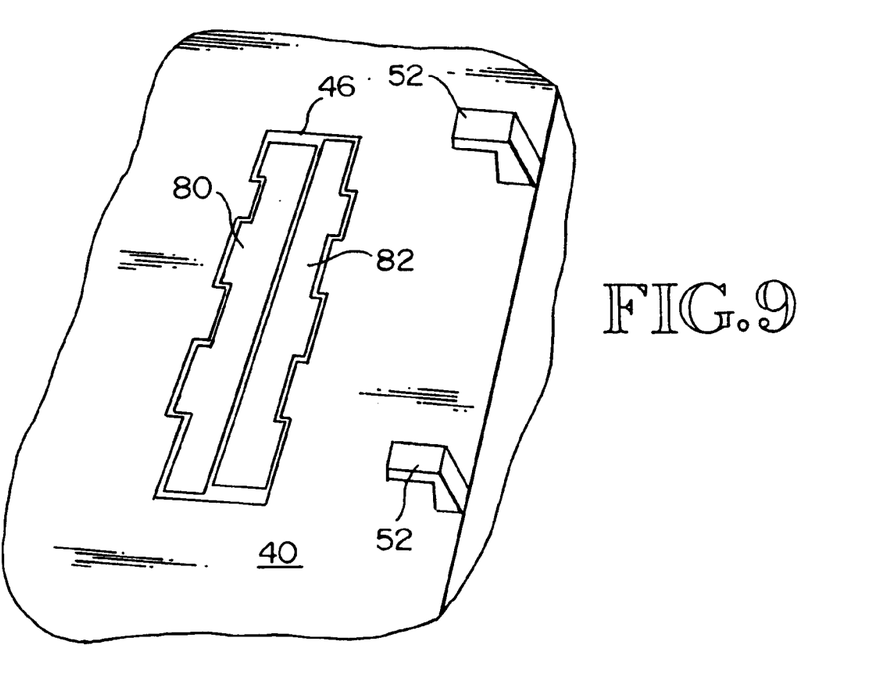
FIG. 9 is a perspective view showing a protective docking connector door in the docking station.

In some embodiments, the docking station 12 includes one or more doors 80 which cover the opening 46 (see FIG. 9). The doors 80 serve to protect the docking station's docking connector 50 (see FIG. 3) from exposure through the opening 46 during times when access to the docking connector 50 is not needed (i.e., while undocked).

Figure 10A:
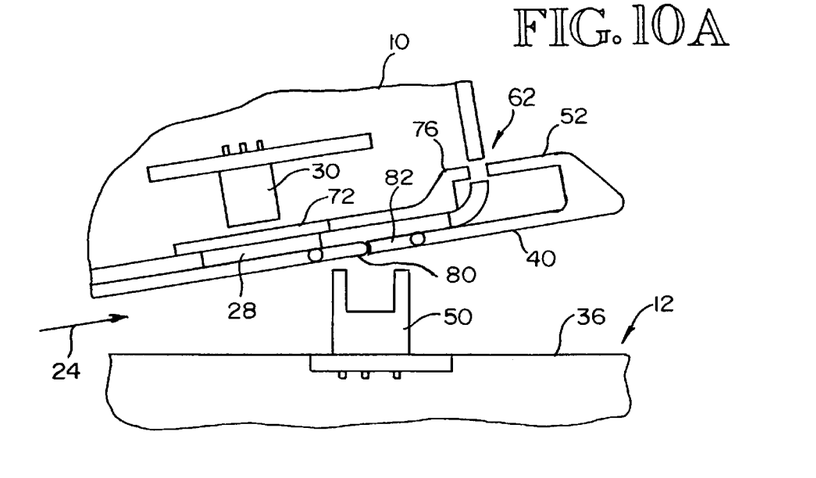
FIGS. 10a–c are diagrams of steps for opening the protective doors of FIGS. 8 and 9 during a docking process.
Figure 10B:
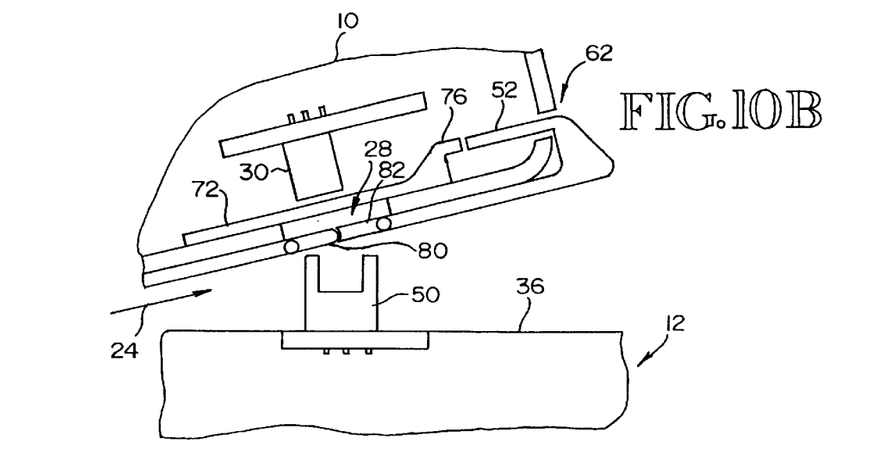
Figure 10C:
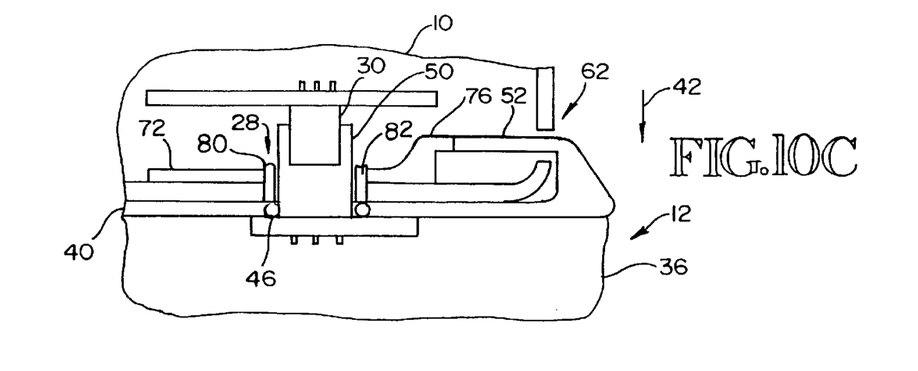

FIGS. 10a–c show the doors 72, 80 opening during the docking process. Referring to FIG. 10a, the doors 72, 80 are closed as the computer 10 moves along the platform 36 up the ramp 40. As the computer 10 moves toward the prescribed alignment position, the docking station hooking mechanisms 52 push against the blocking mechanisms 76 of the door 72. The hooking mechanisms 52 slide the door 72 parallel to the direction of motion 24 revealing the opening 28 and the docking connector 30. FIG. 10b shows the computer 10 in the prescribed alignment position with the door 72 open. Note that the docking station door 80 is still closed. As the operator pushes the computer 10 and ramp 40 downward, the ramp 40 moves toward the platform 36 and the docking station docking connector 50. As the downward push continues, the docking connector 50 pushes the doors 80 open, protrudes upward through the opening 46 and eventually mates with the computers docking connector 30. FIG. 10c shows the docked position with the doors 72, 80 opened and the docking connectors 30, 50 connected.

Rotating Docking Connector Embodiment

Figure 11:
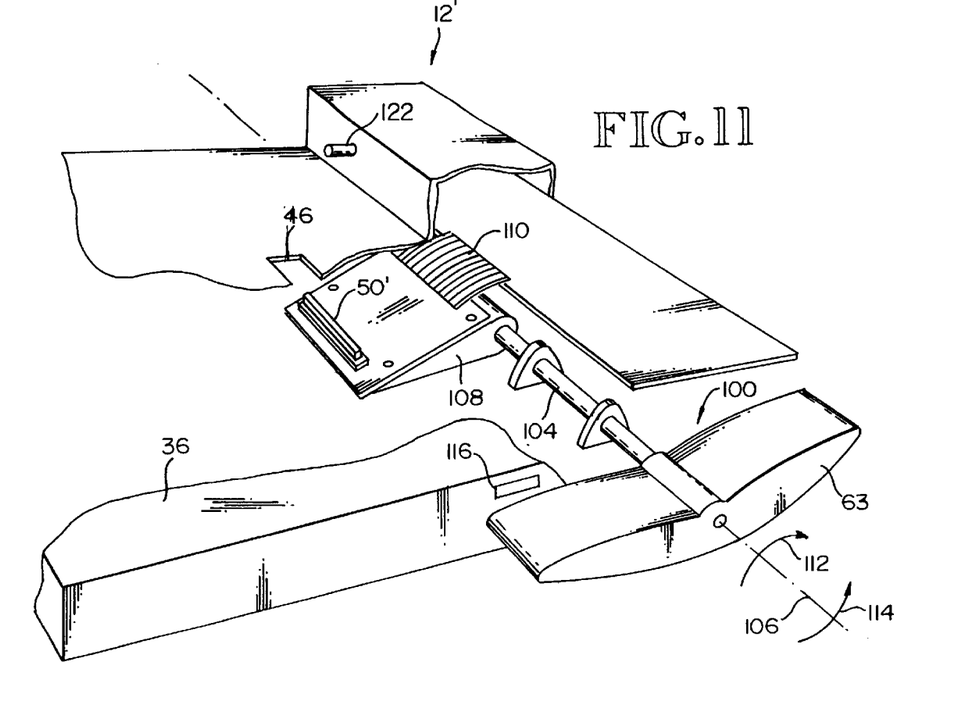
FIG. 11 is a partial cut-away view of a rotating docking connector for a docking station according to an alternative embodiment of this invention.

In an alternative embodiment the docking connector of the docking station 12" moves toward the computer 10, instead of the computer moving toward the docking connector (see FIG. 11). In such embodiment a rotating or elevating ramp is not needed. This is desirable for settings in which a user prefers to place a display monitor on top of the computer. With the computer inserted at the docking station and the monitor positioned, final docking steps occur without moving the computer and monitor. In this embodiment the rails and alignment mechanisms for positioning the computer into a prescribed alignment position relative to the docking station are the same as previously described for the other embodiments.

FIG. 11 shows an alternative lever mechanism 100 coupled to the docking station docking connector 50'. The lever mechanism 100 includes a handle 63 and an elongated shaft 104. The handle 63 rotates about an axis 106 defined by the elongated shaft 104. The shaft is anchored to the docking station platform 36 allowing motion about the axis 106. The docking connector 50' is fixedly coupled to the shaft 104 by a link 108. A connector cable 110 is shown in FIG. 11 which electrically couples the docking connector 50' contacts to various ports along a rear face of the docking station 12".

To perform docking, the computer 10 is slid along the platform 36 and up the ramp 40 or 40' as previously described for the embodiments of FIGS. 3 and 6. With the computer 10 in a prescribed alignment position, the operator manually turns the lever handle 63 in a first direction 112. Such turning rotates the shaft 104 and docking connector 50' toward the docking connector 30 at the undersurface of the computer 10 (see FIG. 2). Continued rotational motion results in mating of the docking connectors 30, 50' (see FIG. 12b). The connection achieved between the docking connectors 30, 50' is strong enough to keep the connectors 30, 50' in a mated position once the handle 63 is released. To undock the computer, the handle 63 is turned in the opposite direction 114 causing the connectors 30, 50' to disengage.

Figure 12A:
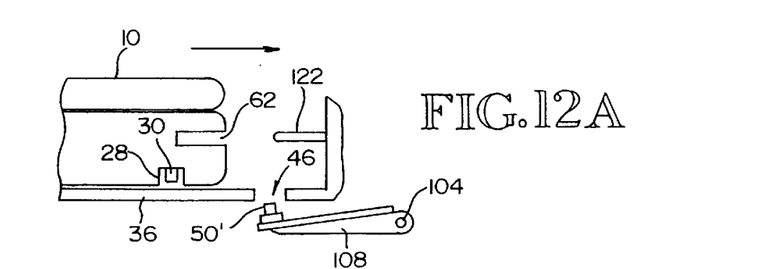
FIGS. 12a–b are diagrams of the notebook computer position relative to the docking station of FIG. 11 at steps of a docking process.
Figure 12B:
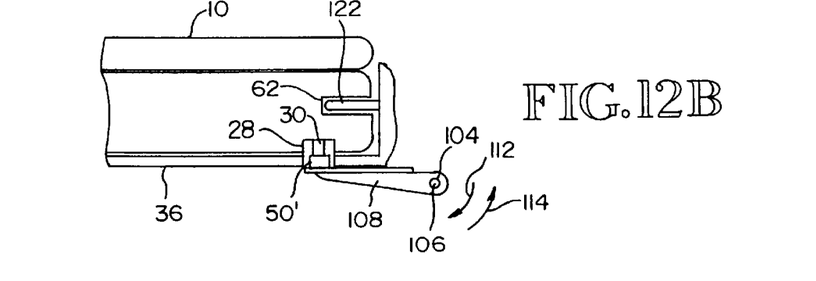

For added security an opening 116 is included in some embodiments. A lock 81, as previously described, is inserted into the opening 116 to prevent turning of the handle 63. With the lock 81 inserted prior to docking, the lock 81 prevents the handle 63 from rotating in the first direction 112. The handle 63 may turn slightly, but not enough to move the connector 50' to the computer 10. As a result, the docking connectors 30, 50' cannot mate and docking can not occur. Similarly, with the lock 81 inserted after docking, the lock 81 prevents the turning of the handle 63 in the other direction 114. The handle 63 may turn slightly, but not enough to separate the connector 50' from the computer 10. As a result, undocking is prevented. FIGS. 12a–b show posts 122 which prevent movement of the computer 10 vertically or laterally relative to the docking station 12". The docking connectors 30, 50' prevent movement of the computer 10 horizontally and laterally relative to the docking station 12". In an alternative embodiment hooking mechanisms 52 or 52' secure the computer 10 to the docking station 12" as described for the prior embodiments.

Docking Computer with Expansion Module

Figures 13, 14:
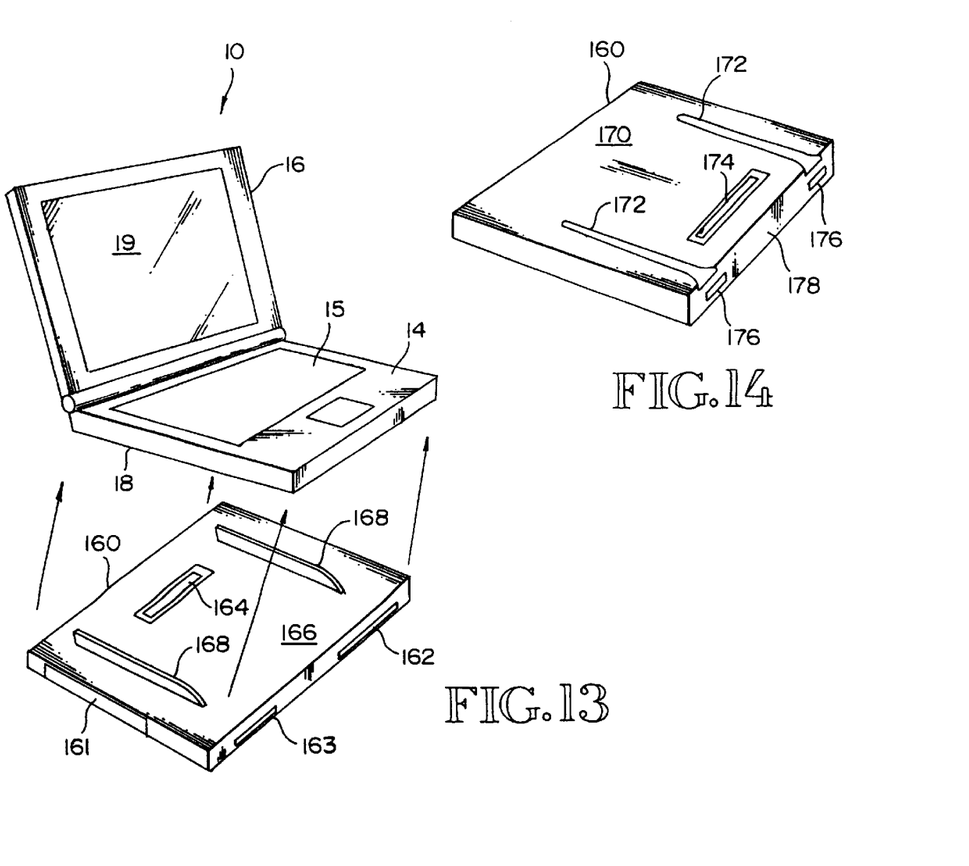
FIG. 13 is a perspective view of a notebook computer and computer expansion module.
FIG. 14 is a planar view of an undersurface of the expansion module of FIG. 13.

In another application an expansion module 160 mounts to the undersurface 18 of notebook computer 10. Referring to FIGS. 13 and 14, the expansion module 160 is a thin generally planar module having approximately the same length and width as the lower compartment 14 of the notebook computer 10. The module 160 houses extra batteries 161, and/or added devices (e.g., CD-ROM drive 162; floppy disk drive 163) to make the computer 10 more functional. The module 160 includes an electrical interface connector 164 which mates to the underside docking connector 30 of the computer 10. The connector 164 is accessible to the computer 10 from an upper surface 166 of the module 160. The module 160 also includes guide structures 168 along upper surface 166 for aligning to the undersurface 18 of the computer 10. The guide structures 168 are similar in function to the guide rails 60 of the docking station 12 (see FIG. 3). The bottom surface 170 of the module 160 has similar structures as the undersurface 18 of the computer 10 so that the module 160 with computer 10 may dock to the docking station 12. In particular the module 160 includes guide tracks 172 or rails at the undersurface 170 along with a docking connector 174 (see FIG. 16). The tracks 172 are similar in function to the tracks 22 at the undersurface of the computer 10 (see FIG. 2). Openings 176 similar in function to openings 62 on the computer 10 are included along a rear edge 178 of the module 160. The computer 10 with expansion module 160 dock to the station 12 according to any of the methods described above.

Meritorious and Advantageous Effects

One advantage of the invention is that the docking process is easy, convenient and reliable. The operator slides the computer onto the ramp, then pushes down on the computer or actuates a lever. Such manual docking has the ease and reliability of an automated process, but is achieved at substantially less cost. Another advantage is that the docking connectors are unexposed while the computer is away from the docking station preventing damage and avoiding exposure to dust. Another advantage of the invention is that the lever can be locked in place preventing theft, and unauthorized docking and undocking.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A method for docking a portable computer to a docking station, in which the portable computer has an undersurface upon which the portable computer rests and a first opening at the undersurface, the portable computer including a first docking connector located within the first opening, the docking station including a platform having an upward surface for receiving the undersurface of the portable computer, a second docking connector protruding from the upward surface of the platform, and a ramp having a proximal portion and a distal portion, the proximal portion rotatably coupled to the platform, the ramp having a relaxed position in which the distal portion is elevated relative to the platform and a depressed position in which the distal portion is rotated down to the platform upward surface, wherein the second docking connector protrudes beyond a height of the ramp relative to the platform while the ramp is in the depressed position and protrudes less than the height of the ramp relative to the platform while the ramp is in the relaxed position, wherein the second docking connector is positioned relative to the ramp so as not to contact the portable computer while the ramp is in the relaxed position, the method comprising the steps of:

sliding the portable computer along the docking station platform and onto the docking station ramp, and sliding the portable computer up the docking station ramp to a prescribed alignment position achieved by the mating of a portable computer alignment mechanism and a docking station alignment mechanism, wherein at the prescribed alignment position the first docking connector and second docking connector are aligned and unconnected;

moving the ramp from the relaxed position to the depressed position thereby moving the second docking connector relative to the first docking connector to mate the first docking connector and second docking connector, the mated first docking connector and second docking connector forming an electrical interface between the portable computer and the docking station.

2. The method of claim 1, further comprising the step of securing the portable computer to the docking station with a hooking mechanism.

3. The method of claim 1, in which the step of relatively moving the second docking connector comprises moving a lever to actuate mating of the first docking connector and second docking connector.

4. The method of claim 3, further comprising the step of locking the lever to prevent either one or both of docking or undocking of the portable computer.

5. The method of claim 1, further comprising during the step of sliding the portable computer up the docking station ramp, the step of mating a portable computer alignment mechanism with a docking station alignment mechanism.

6. The method of claim 1, in which the portable computer comprises a door for the first opening, the method further comprising the step of opening the door during the step of sliding the portable computer up the docking ramp.

7. The method of claim 6, in which the ramp has an opening aligned with the second docking connector and includes a door for the ramp opening, wherein while the ramp is in the relaxed position the door blocks the ramp opening protecting the docking connector, the method comprising the step of opening the ramp door during the step of pushing down the computer relative to the platform.

* * * * *